US012662388B2

(12) United States Patent
Rizzi

(10) Patent No.: US 12,662,388 B2
(45) Date of Patent: Jun. 23, 2026

(54) CONTROL OF AN AMMONIA SYNTHESIS LOOP AT PARTIAL LOAD

(71) Applicant: CASALE SA, Lugano (CH)

(72) Inventor: Maurizio Rizzi, Villa Guardia (IT)

(73) Assignee: CASALE SA, Lugano (CH)

( * ) Notice: Subject to any disclaimer, the term of this patent is extended or adjusted under 35 U.S.C. 154(b) by 689 days.

(21) Appl. No.: 18/006,752

(22) PCT Filed: Sep. 10, 2021

(86) PCT No.: PCT/EP2021/074911
§ 371 (c)(1),
(2) Date: Jan. 25, 2023

(87) PCT Pub. No.: WO2022/089820
PCT Pub. Date: May 5, 2022

(65) Prior Publication Data
US 2023/0331569 A1      Oct. 19, 2023

(30) Foreign Application Priority Data
Oct. 30, 2020      (EP) ..................................... 20204831

(51) Int. Cl.
*C01C 1/04* (2006.01)
(52) U.S. Cl.
CPC ............ *C01C 1/0482* (2013.01); *C01C 1/047* (2013.01)
(58) Field of Classification Search
CPC ..... C01C 1/0482; C01C 1/047; Y02P 20/133; Y02P 20/52
See application file for complete search history.

(56) References Cited

U.S. PATENT DOCUMENTS

| 4,215,099 A | 7/1980 | Pinto et al. | |
| 2012/0207663 A1* | 8/2012 | Iob | C01C 1/0482 |
| | | | 422/148 |
| 2013/0039835 A1* | 2/2013 | Ostuni | C01B 3/506 |
| | | | 422/148 |
| 2013/0108538 A1 | 5/2013 | Ostuni et al. | |
| 2019/0367379 A1 | 12/2019 | Filippi et al. | |

FOREIGN PATENT DOCUMENTS

| CL | 2018000050 A1 | 4/2018 |
| CN | 102596808 A | 7/2012 |
| EP | 3426601 B1 | 5/2020 |

(Continued)

OTHER PUBLICATIONS

International Search Report and Written Opinion from International Application No. PCT/EP2021/74911 mailed Nov. 29, 2021.

(Continued)

*Primary Examiner* — Anthony J Zimmer
*Assistant Examiner* — Abdul-Rahman Yusuf Waleed Smari
(74) *Attorney, Agent, or Firm* — Ballard Spahr LLP

(57) ABSTRACT

A process for synthesis of ammonia wherein an ammonia synthesis loop includes an ammonia converter where a makeup gas is reacted to form ammonia, and the loop is controlled at a partial load by reducing the synthesis pressure and maintaining the reduced pressure within a desired range by controlling a bypass line of make-up gas of the converter.

10 Claims, 1 Drawing Sheet

(56)            References Cited

FOREIGN PATENT DOCUMENTS

| | | | |
|---|---|---|---|
| JP | 2003020221 | A | 1/2003 |
| JP | 2020066573 | A | 4/2020 |
| RU | 2545546 | C2 | 4/2015 |
| RU | 2561970 | C2 | 9/2015 |
| WO | 2017153304 | A1 | 9/2017 |
| WO | 2021089276 | A1 | 5/2021 |

OTHER PUBLICATIONS

Beerbuhl, et al., "Combined scheduling and capacity planning of electricity-based ammonia production to integrate renewable energies", European Journal of Operational Research, 241, 2015, pp. 851-862.

* cited by examiner

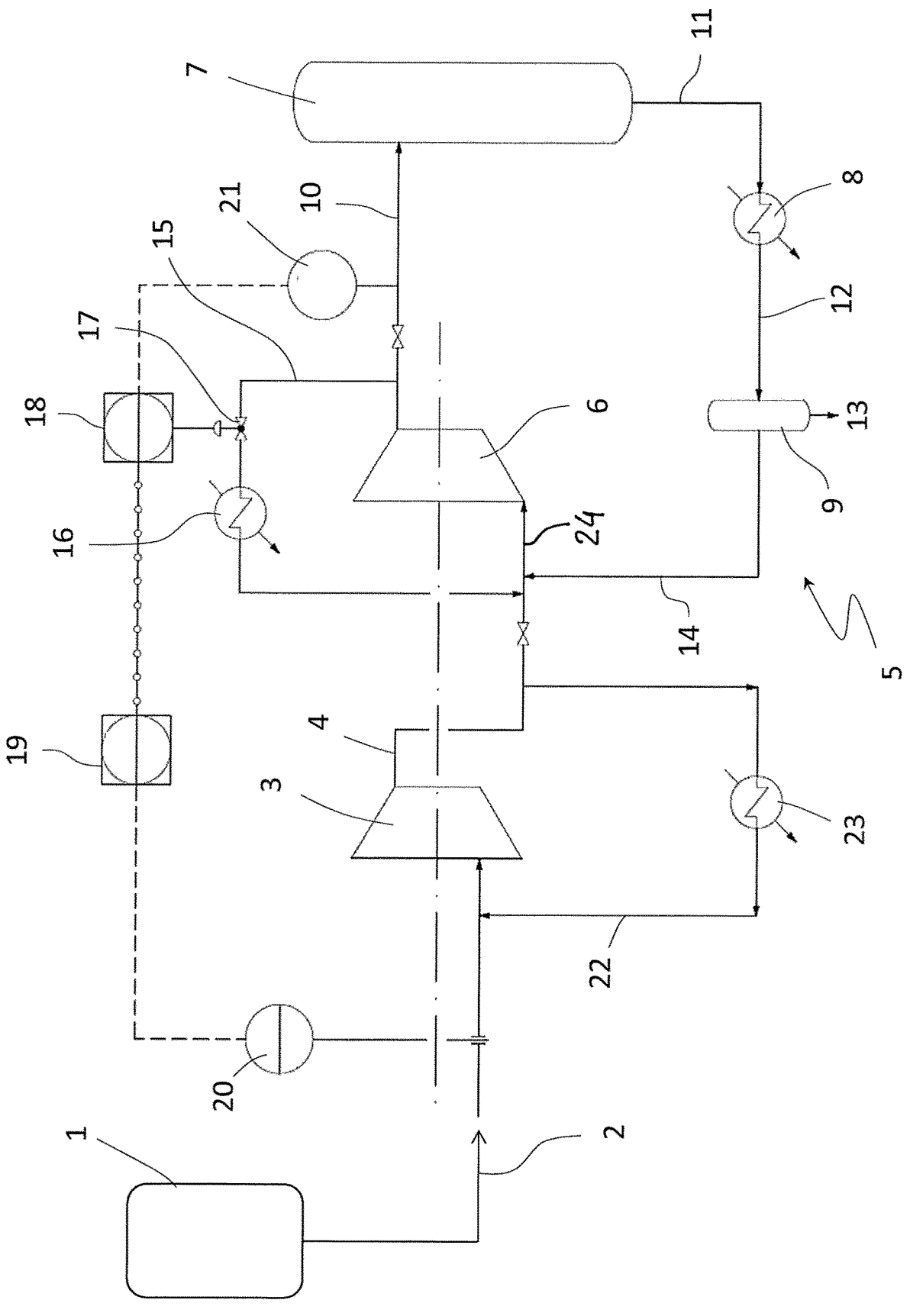

CONTROL OF AN AMMONIA SYNTHESIS LOOP AT PARTIAL LOAD

FIELD OF THE INVENTION

The present invention relates to the field of industrial synthesis of ammonia. Particularly the invention relates to the technique of controlling an ammonia synthesis loop at partial load.

PRIOR ART

Industrial production of ammonia includes basically the generation of a makeup ammonia synthesis gas (MUG) in a front-end and conversion of said make-up gas in a so-called ammonia synthesis loop.

The generation of the MUG in the front end is conventionally based on hydrogen generation from reforming of a hydrocarbon source or of a carbonaceous source, for example natural gas or coal, and addition of nitrogen to reach the appropriate hydrogen to nitrogen ratio for the synthesis of ammonia. The hydrogen generation may comprise reforming in a primary reformer and secondary reformer and subsequent purification of the gas, e.g. to remove carbon monoxide, carbon dioxide and residual methane. Nitrogen can be added separately or together with firing air in a secondary reformer, according to various embodiments of the front-end.

The so obtained MUG is elevated to the ammonia synthesis pressure with a main compressor and is converted into ammonia in a synthesis loop which typically includes at least: a circulator, a catalytic converter, a condenser, a separator. The converter produces a hot ammonia-containing gaseous product which, after condensation, is separated into a liquid ammonia product and a gaseous phase recycled to the suction of the circulator. The circulator receives the high-pressure MUG delivered by the main compressor and serves to maintain the circulation in the loop.

The ammonia synthesis loop is normally designed to run always at its full capacity or close to the full capacity, corresponding to a nominal flow rate of MUG generated in the front-end and transferred to the synthesis loop via the main compressor. Generally, running a conventional ammonia synthesis loop at a partial load below 60%-70% of its capacity is not considered feasible or attractive.

A sudden change in the load of the converter is considered potentially harmful for the converter itself and other equipment of the high-pressure synthesis loop. For example, a fast variation of load may cause high gas velocity which can damage the internals of the converter or other items of the loop. A sudden pressure drop may result in a shock ("hammering") and damage of the equipment.

In addition, at relatively low partial load the ammonia synthesis reaction may not be thermally self-sustained particularly because the converter would receive an excessive amount of recycled ammonia compared to the fresh makeup gas and would not be able to preheat the fresh charge appropriately. The ammonia converter is normally equipped with a start-up heater; however using the start-up heater to sustain the reaction at a partial load is generally not attractive from an economical point of view and, additionally, most gas-fired heaters would not be able to follow a fast variation of load.

For all the above reasons, an ammonia converter and an ammonia synthesis loop are normally regarded as being not suitable to run at partial loads.

On the other hand, the conventional front-ends based on hydrocarbon reforming are normally operated at their full capacity to compensate for their investment costs and therefore, up to now, the poor flexibility of the synthesis loop was not perceived as a serious drawback.

In recent times, however, the so-called green ammonia plants emerged, wherein at least some of the hydrogen generated in the front-end is obtained from renewable sources. For example, hydrogen can be obtained from water electrolysis powered by a photovoltaic or wind energy and the required nitrogen may be obtained from ambient air in a pressure swing adsorption (PSA) unit or in a cryogenic air separation unit (ASU).

These ammonia plants where hydrogen comes from renewable sources are of great interest because of low operational cost and low pollution, for example they do not produce CO2 contrary to a conventional coal-based or natural gas-based process. However renewable sources like solar or wind are intrinsically subject to fluctuations, e.g. solar energy is not available during nighttime. In a green ammonia plant, the amount of makeup gas produced in the front end and transferred to the ammonia synthesis loop may vary significantly and rapidly. An ammonia synthesis loop coupled to a front end powered by renewable sources may be required to follow fast load changes and to run at low loads down to about 20-25% of the nominal capacity.

The known ammonia synthesis loops and their control systems, designed for running always at full load coupled to conventional reforming based front ends, are not suitable to follow the fast changes of load of green plants. To date, a solution to the above need is the provision of a buffer tank of the pressurized MUG, which is however large and very expensive. This drawback is a limiting factor for the exploitation of renewable energy in the field of ammonia synthesis.

US 2013/108538 discloses a method for load regulation of an ammonia plant. The integration of intermittent electricity generation with ammonia production is discussed in Schulte Beerbuehl et al., "Combined Scheduling and capacity planning of electricity-based ammonia production to integrate renewable energies", vol. 241 no. 3, 15 Nov. 2014, pages 851-862.

SUMMARY OF THE INVENTION

The invention aims to the provision of an ammonia synthesis loop, and a related method of control, adapted to run in a broad range of operating load and to follow fast load variations with a small gas buffer or even without the need of a gas buffer. Accordingly, the invention aims to an ammonia synthesis loop which is better suitable for operation with a front-end wherein hydrogen is generated from a renewable energy source and therefore the production of makeup gas is subject to fluctuation. Still another aim of the invention is to provide more possibilities for the exploitation of the renewable energy sources in the field of industrial production of ammonia.

This aim is reached with a process for synthesis of ammonia and a method of controlling an ammonia synthesis loop according to the claims. The invention further relates to a synthesis loop for the synthesis of ammonia with a control system configured to operate in accordance with the inventive method.

The invention provides a strategy of controlling an ammonia loop at a partial load based on the following:

the synthesis pressure is lowered to a reduced ammonia synthesis pressure, which is less than the nominal synthesis pressure at full load of the converter;

the synthesis pressure is controlled, in accordance with the load of the converter, to remain within a target range which includes said reduced synthesis pressure;

the control of the synthesis pressure includes bypassing the converter with a selected portion of the converter feed gas.

The above control can be implemented by separating a gas stream from a converter feed line at a point upstream of the converter to form a bypass stream, and by reintroducing said bypass stream at a suitable point downstream of the converter.

The reduced synthesis pressure may be a minimum synthesis pressure. Said minimum pressure may be determined as the minimum pressure at which the converter is stable in a self-sustaining operation. In preferred embodiments said reduced pressure is 50% to 80% of the nominal pressure. For example the reduced pressure may be about 60% or 70% of the nominal pressure.

Said reduced synthesis pressure may correspond to a partial load of about 40% to 60%. This percentage denotes the percentage of volumetric flow rate of make-up gas compared to nominal load.

In an embodiment, the method of the invention operates by lowering the synthesis pressure to said reduced synthesis pressure in response to a first decrease of the load of the converter, for example from full load to a first partial load; in response to subsequent decreases of load, for example from said first partial load to a second partial load smaller than the first partial load, the method of the invention maintains the pressure within the target range by controlling the converter bypass.

The control system of the invention may react to a condition of partial load, e.g. passing from 100% to 50%, by lowering the pressure of the loop; then the control system operates the converter bypass to keep the pressure substantially constant, within the above mentioned target range, even in case of another considerable reduction of load, e.g. from 50% to 25%. To this purpose the control system may control a suitable valve on the bypass line determining the flow rate in the bypass line.

The target range of pressure may be centred at the reduced synthesis pressure. This means the range may be symmetrical around the reduced synthesis pressure. The control of the invention may be configured to keep the pressure substantially constant after it has been lowered to the above mentioned reduced value. Hence the target range may be a narrow range. For example said target range may be preferably +/−15% of the reduced synthesis pressure, more preferably +/−10% of said pressure and even more preferably +/−5% of said pressure.

Reducing the pressure at a partial load condition has basically two advantages. First, the equilibrium curve of the ammonia synthesis reaction in the converter is shifted, which means the reaction is slown down and the reagents are converted less rapidly. In accordance with this, the converter adapts to the condition of reduced load, which means a less amount of reagents fed to the converter. A second advantage is an increase in the velocity of the gas through the catalytic beds of the converter, thus leading to a more uniform temperature profile. These advantages help the converter to adapt to the condition of reduced load without getting unstable.

Starting from this operation at reduced pressure, the converter can follow a subsequent reduction of load thanks to the bypass of the feed gas.

The invention provides a synthesis loop and a synthesis converter which can conform to a rapid change of the amount of makeup gas available from the front-end.

Thanks to the bypass feature of the invention, the converter is protected from overheating, excessive gas velocity and other perturbation that may be caused by a fast change in the makeup gas input flow rate. Even when the amount of makeup gas produced in the front end is small, the reactor is kept in a condition close to the condition of full load, except for the flow rate.

The converter is stabilized and is less sensitive to the fluctuations of the front-end production.

A synthesis loop controlled according to the invention is therefore particularly suitable for coupling with a front-end powered by a renewable energy source, being able to follow the related fluctuation of makeup gas production and to provide stable operation down to 20% of nominal capacity or even less. The converter is maintained in a self-sustained mode of operation over a broad range of output, avoiding or reducing the need to furnish heat e.g. using the startup heater.

The invention is applicable whichever the capacity of ammonia production, from very small plants to very large, operating with reciprocating compressors or centrifugal compressors.

DESCRIPTION OF THE INVENTION

The ammonia synthesis loop normally comprises a converter where ammonia is synthesized catalytically; a circulator, which is a compressor configured to maintain circulation in the loop and to deliver a feed gas, which includes the make-up synthesis gas, to said converter; a converter feed line from the circulator to the converter; a condensation section arranged downstream the synthesis section to receive an ammonia-containing gaseous product; a separation section wherein a condensate produced in said condensation section is separated into an ammonia liquid product and a gaseous recycle stream; a recycle line from the separation section to the suction of the circulator.

A synthesis loop normally comprises a single converter. However the invention is also applicable to a loop including more than one converter.

The synthesis loop may include additional items, for example one or more heat exchangers. Particularly, heat exchangers may be provided to preheat the feed stream directed to the converter or to recover heat by cooling the hot effluent of the converter.

A synthesis loop according to the invention may include a bypass line arranged to take a gas stream from said converter feed line, at a point upstream of the converter and downstream of the circulator, and to reintroduce said bypass stream at the suction side of the circulator or into the ammonia synthesis loop at a point downstream of said separation section.

The bypass stream may bypass all or some of the items in the synthesis loop, including the converter. The bypass stream may be reintroduced at the suction of a circulator or downstream of the separation section wherein ammonia liquid product is separated. A related advantage is the bypass stream does not mix with the ammonia-containing gaseous product effluent from the converter and the effluent of the converter is not diluted by the by-pass gas. Therefore, the condensation of ammonia is not affected by the bypass.

The amount of the makeup gas bypassing the converter (also termed bypass rate) can be determined for example by a valve operated by a suitable control system. The control system calculates the appropriate bypass rate based on one or more signal(s) and governs the opening of the valve accordingly. The bypass rate can be determined to keep one or more control parameter(s) within a target range. Control parameters may include preferably one or more of: the pressure in the converter, the pressure in the loop, the difference of temperature across the converter.

An ammonia synthesis converter has a full load condition corresponding to the processing of a nominal flow rate of make-up gas transferred from the front end to the synthesis loop. A partial load condition is a condition wherein the flow rate of make-up gas transferred from the front end to the synthesis loop is smaller than said nominal flow rate. The flow rate of make-up gas transferred from the front end to the synthesis loop can be measured, for example, at the suction of the main syngas compressor. The term "syngas" is used for short to denote the make-up synthesis gas produced in the front-end.

The amount (i.e. flow rate) of the bypass stream can be determined, according to various embodiments, taking into account one or more of the following:

i) the instant flow rate of the makeup gas transferred from the front end to the ammonia synthesis loop;
  ii) the variation over time of the flow rate of makeup gas transferred from the front end to the ammonia synthesis loop;
  iii) the pressure in the synthesis loop or inside the converter;
  iv) the difference of temperature across the converter;
  v) the hydrogen to nitrogen (H/N) ratio at the converter inlet;
  vi) the ammonia final condensation temperature;
  vii) the inlet temperature of at least one of the catalytic beds of the converter, or of each of the catalytic beds of the converter.

The parameter i) corresponds to a percentage of load of the ammonia plant. It can be measured with a suitable gauge e.g. at the suction of the main makeup gas compressor which raises the pressure of the gas delivered by the front end to the ammonia synthesis pressure.

The parameter ii) provides an indication of how fast the variation of the flow rate of makeup gas. Use of said parameter may include measuring the time derivative of the flow rate.

The parameter iii) can be acquired by a direct detection of the pressure in the condenser or in another selected location of the loop, for example at the converter inlet. Normally all items in the ammonia synthesis loop operate substantially at the same pressure, apart from pressure drops and possible difference in elevation. Therefore, the loop pressure and the pressure in the converter are normally considered to be the same.

The parameter iv) is the difference between the temperature of the feed gas entering the converter and the temperature of an ammonia-containing product withdrawn from the converter. This difference can also be termed converter delta-T.

The parameter v) corresponds to the ratio between the hydrogen and the nitrogen molar concentration in the feed stream of the converter. Said ratio can be measured for example by gas analysis and/or measuring the flow rates of the hydrogen and nitrogen produced. Said ratio is preferably maintained close to 3 because a deviation from this value means that one reactant is in excess acting mostly as inert.

The parameter vi) corresponds to the lowest temperature of condensation of ammonia in the condensation section of the synthesis loop where hot ammonia-containing gaseous product withdrawn from the converter is condensed and liquid ammonia is obtained.

In preferred embodiments, the amount of bypass gas is determined to maintain the above parameter iii) and/or parameter iv) within a target range which is close to the normal operation at full load.

The converter delta-T is maintained preferably within a selected range compared to the delta-T at full load. Normally, the converter delta-T at partial load is smaller than the converter delta-T at full load. The acceptable variation of delta-T may depend on the embodiment of the ammonia converter, for example a multi-bed converter may experience a greater variation of delta-T when passing from full load to partial load. Preferably the converter delta-T at partial load is in the range of plus or minus 60° C., more preferably plus or minus 40° C. or 50° C., with reference to the converter delta-T at normal full load operating condition.

The parameter vii) is of particular importance to avoid that a catalytic bed falls under a minimum operation temperature during fast transients. For example if the temperature of the catalyst mass drops below a given threshold, the catalyst may become inactive and the synthesis reaction is practically shutdown. Accordingly a preferred feature of the invention includes detecting the temperature of the inlet gas of at least one catalytic bed of the converter and determining a bypass flow of the converter in accordance with the detected temperature(s).

In most cases, an ammonia converter includes a plurality of catalytic beds arranged in series and traversed sequentially by the gas flow. In such case the process includes preferably detecting the temperature of at least the first catalytic bed of the sequence. This is because the first bed, which receives the fresh stream of makeup gas and is the most reactive, may be the most critical to control due to its very rapid variations of temperature.

It has to be noted the inlet temperature of the beds can be controlled by regulating quench flows or bypass flows, when provided; however these methods may not be sufficient or not fast enough for controlling the highly reactive first catalytic bed.

In case of a multi-bed converter, the control may be set to start bypassing the converter when the inlet temperature of at least one bed drops below a listed value or in case the converter delta-T drops below a listed value.

The condition of partial load may include loads until the syngas transferred from the frontend to the synthesis loop is 20% of the nominal flow rate or even less, for example 15% of the nominal flow rate. The lowest partial load which is acceptable in practice may depend on the source of hydrogen. In applications where the hydrogen source is provided by alkaline electrolyzers, a partial load of 20% is normally considered the lowest acceptable partial load. In case of a different hydrogen source a lower partial load (less than 20%) may be reached. In some embodiments a partial load as low as 10% can be reached.

The amount of bypass gas may be determined on the basis of one or more of: the pressure in the converter or in the loop; the inlet temperature of one or more of the catalytic beds; the converter delta-T as above defined. These parameters may be regarded as key parameters for the determination of the appropriate bypass flow rate in the partial load conditions. Other parameters like the variation in the makeup gas flow rate and the ammonia condensation temperature may be advantageously used to refine the calculation of the bypass flow rate in order to provide a smooth and more stable operation.

In an embodiment, a dedicated control is provided against drop of flow or surge of flow. The term drop of flow denotes a sudden drop of the amount of makeup gas transferred from the front-end to the synthesis loop. The term surge of flow denotes a sudden increase of the amount of makeup gas transferred from the front-end to the synthesis loop.

A further aspect of the invention provides: detecting a drop or surge of the flow rate of flow rate of makeup gas transferred from the front end to the synthesis loop, and increasing the amount of gas in the bypass stream in the event of a drop of flow or decreasing said amount in the event of a surge of flow.

Particularly in the event of a drop of flow a preferred embodiment provides that:

the amount of bypass gas is increased;

subsequently, the amount of bypass gas is controlled to keep the pressure in the converter, or the converter delta-T, at a constant value or within a target narrow range.

In the event of a surge of flow a preferred embodiment provides that:

the amount of bypass gas is decreased;

subsequently, the amount of bypass gas is controlled to keep the pressure in the converter, or the converter delta-T, at a constant value or within a target narrow range In both the above mentioned two events, the amount of bypass gas is increased or respectively decreased immediately after the drop or surge of flow is detected. The increase/decrease of the bypass flow rate is operated directly upon the detection of the drop/surge of flow, for example at the suction of the main gas compressor, not upon detection of the related effect on the synthesis loop.

In the event of a drop flow, the reaction may be lost due e.g. to a low temperature of the input gas. Particularly, if the input gas temperature falls below a given threshold, the catalyst may be no longer active and the chemical reaction stops. The increase in the amount of bypass gas avoids this undesired consequence.

In the event of a surge of the flow, the loop pressure may increase suddenly, causing the safety valves to open. The decrease in the amount of bypass gas avoids this undesired consequence.

A feed-forward control may be used to react to the above described events of drop of flow or surge of flow.

Still another preferred embodiment of the invention includes the step of cooling the makeup gas bypassing the converter, before its reintroduction at the suction of the circulator.

The amount of bypass gas can be governed by a suitable control system. In an embodiment, for example, a control system receives a signal of the amount of available makeup gas, for example at the suction of the main compressor and one or more signals reflecting the current operational state of the synthesis loop. Said signal(s) may include for example the pressure in the converter, the converter delta-T, the gas inlet temperature of the catalytic beds. Based on the input about the flow rate and operational state of the loop, the control system may determine the bypass flow rate e.g. by controlling the opening position of a valve placed on the bypass line of the loop.

DESCRIPTION OF THE FIGURE(S)

The invention is now further elucidated with reference to FIG. 1 which illustrates a scheme of an ammonia synthesis loop according to an embodiment of the invention.

In FIG. 1, the block 1 denotes a front-end which produces a make-up ammonia synthesis gas (syngas) 2. The make-up gas 2 is fed to a main compressor 3 which delivers a compressed gas 4 to a synthesis loop 5.

The loop 5 comprises basically a circulator 6, a converter 7, a condenser 8 and a separator 9. The condenser 8 forms a condensation section and the separator 9 forms a separation section.

A gas feed is provided to the converter 7 via a converter feed line 10. A hot ammonia-containing gaseous product at line 11 is withdrawn from the converter 7 and is condensed in the condenser 8; the condensate in line 12 is separated in the separator 9 into a liquid ammonia product exported via line 13 and a gaseous phase in line 14 containing some unreacted hydrogen and nitrogen and residual vapors of ammonia, which is recycled to the suction of the circulator 6.

The feed line 10 from the circulator 6 to the converter 7 is connected to a bypass line 15 which bypasses the converter 7, the condenser 8 and the separator 9, thus connecting the delivery side of the circulator 7 back to its suction. The bypass line 15 optionally comprises a by-pass cooler 16.

The lines 10, 11 and 14 may include heat exchangers (not shown).

A valve 17 is provided on the bypass line 15 to control the flow rate through said line 15. In the example, the valve 17 has a controller 18 connected to a control unit 19.

The control unit 19 is connected to a flow gauge 20 which is arranged to detect the incoming flow rate of makeup gas from the front-end 1. For example the flow gauge 20 senses the flow rate of makeup gas 2 at the suction of the main compressor 3.

The control unit 19 is also connected to a loop pressure sensor 21 which detects the pressure at the converter inlet, for example on the line 10.

Based on the input signals from the flow gauge 20 and the loop pressure sensor 21, the control unit 19 calculates the appropriate opening of the valve 17 and, consequently, the amount of gas flowing in the bypass line 15.

An anti-surge line 22 of the main compressor 3 is also illustrated. Said line 22 includes a gas cooler 23. With the anti-surge line 22, some gas taken from the line 4 can be sent back to the suction of the main compressor 3.

In operation, the circulator 6 receives at its suction inlet 24 the compressed make-up gas 4 delivered by the main compressor 3, mixed with the gaseous phase via line 14 from top of the loop separator 9 and possibly mixed with bypass gas in the line 15.

The flow rate at the delivery side 25 of the circulator 6 can be partially deviated to the bypass line 15 according to the position of the valve 17; the remaining portion is fed to the converter 7 via the delivery line 10.

The converter 7 has a nominal ammonia synthesis pressure (also termed loop pressure) at 100% capacity, for example about 140 bar. At partial loads, the control unit 19 operates the valve 17 to vary the amount of make-up gas actually admitted to the converter 7, to keep the pressure in the loop and the converter, for example the pressure detected by the sensor 21, within a target range.

In another embodiment, the circulation in the loop and the bypass flow rate in the line 15 can be controlled on the basis of the converter delta-T, e.g. by taking a converter inlet temperature $T_{10}$ at converter input line 10 and a converter output temperature $T_{11}$ at line 11. In this embodiment, the control unit 19 may be configured to keep the converter delta-T ($T_{11}-T_{10}$) within a target range. Particularly, the system may be configured to avoid overheating of the converter and to avoid that the temperature falls below a minimum, which may cause the converter to lose the self-sustaining condition.

Additionally, the control unit 19 may be configured to react to a rapid change in the flow rate measured by the gauge 20. For example, the control unit 19 may command a pre-opening of the valve 17 in case of a sudden drop of the flow rate of makeup gas 2. In this step the unit 19 may operate with a feed-forward control technique. Then, the unit 19 switches to normal control to keep the loop pressure stable. Similarly, the control unit 19 may react to a surge of the flow by closing the valve.

Example 1

The following example 1 relates to a small-scale ammonia production plant with a capacity of 3 metric tons per day (MTD) of ammonia. The symbol $m^3/h_{EFF}$ denotes the cubic meters per hour at the conditions of temperature and pressure of the synthesis loop. The symbol $Nm^3/h$ denotes cubic meters per hour at normal conditions of atmospheric pressure and 0° C. The table indicates the inlet temperature of the first catalytic bed which triggers the opening of the bypass valve. The pressure is given in bar gauge (bar g).

| EXAMPLE 1 | 100% load | 60% load | 30% load |
|---|---|---|---|
| Pressure (bar g) | 226 | 175 | 175 |
| MUG flow (Nm³/h) | 338 | 203 | 101 |
| Circulation m³/h_EFF | 12.04 | 11.80 | 5.9 |
| Converter ΔT (Tout-Tin) | 122.4 | 95.4 | 95.4 |
| First bed inlet temperature triggering the bypass (° C.) | 375 | 375 | 375 |
| Ammonia @ converter inlet (mol %) | 11.3 | 13.21 | 13.21 |
| Ammonia @ converter outlet (mol %) | 20.99 | 20.52 | 20.52 |
| Delta Ammonia (OUT-IN)— - mol % | 9.69 | 7.31 | 7.31 |

Example 2

The following Example 2 relates to a large ammonia production plant rated at 1000 MTD of ammonia. The parameters are same as in the Example 1.

| EXAMPLE 2 | 100% load | 50% load | 25% load |
|---|---|---|---|
| Pressure (bar g) | 138.5 | 96.6 | 96.6 |
| MUG flow (Nm³/h) | 109737 | 55098 | 27549 |
| Circulation m³/h_EFF | 4713 | 2941 | 1470 |
| Converter ΔT (Tout-Tin) | 265.7 | 220 | 220 |
| Inlet temperature of first bed/second bed/third bed triggering the bypass (° C.) | 360/400/380 | 360/400/380 | 360/400/380 |
| Ammonia @ converter inlet (mol %) | 2.58 | 3.51 | 3.51 |
| Ammonia @ converter outlet (mol %) | 20.64 | 20.50 | 20.50 |
| Delta Ammonia (OUT-IN)— - mol % | 18.06 | 16.99 | 16.99 |

The invention claimed is:

1. A process for synthesis of ammonia, the process comprising:

producing an ammonia make-up synthesis gas in a front-end;

raising the pressure of said make-up gas in a first compressor;

feeding high-pressure make-up synthesis gas delivered by said first compressor to an ammonia synthesis loop;

wherein said ammonia synthesis loop includes at least:

a converter where ammonia is synthesized catalytically;

a circulator, which is a compressor configured to maintain circulation in the loop and to deliver a feed gas, which includes the make-up synthesis gas, to said converter;

a converter feed line from the circulator to the converter;

a condensation section arranged downstream from the ammonia synthesis loop to receive an ammonia-containing gaseous product; and a separation section wherein a condensate produced in said condensation section is separated into an ammonia liquid product and a gaseous recycle stream;

a recycle line from the separation section to a suction of the circulator;

wherein the ammonia synthesis loop has a full load condition corresponding to the processing of a nominal flow rate of make-up gas transferred from the front end to the ammonia synthesis loop; and controlling the loop at a partial load condition, wherein the flow rate of make-up gas transferred from the front end to the loop is smaller than said nominal flow rate, by the following steps:

the pressure at which ammonia is synthesized is lowered to a reduced ammonia synthesis pressure, which is less than a nominal synthesis pressure at said full load condition of the ammonia synthesis loop; and the synthesis pressure is maintained within a target range which includes said reduced synthesis pressure, by controlling a flow rate of feed gas bypassing the converter.

2. The process of claim 1, wherein said reduced synthesis pressure is in the range of 50% to 80% of the nominal synthesis pressure.

3. The process of claim 1, wherein said target range is centred at the reduced synthesis pressure, and wherein the target range is +/−15% of the reduced synthesis pressure.

4. The process of claim 3 wherein said target range is +/−10% of said reduced synthesis pressure.

5. The process of claim 3 wherein said target range is +/−5% of said reduced synthesis pressure.

6. The process of claim 1, further comprising detecting the temperature of the feed gas of at least one catalytic bed of the converter and determining a bypass flow of the converter in accordance with the detected temperature, wherein the converter includes a plurality of catalytic beds arranged in series and traversed sequentially by the feed gas, and the process includes detecting the temperature of the first catalytic bed of the sequence.

7. The process of claim 1, further comprising detecting the difference of temperature across the converter, which is the difference between the temperature of the feed gas entering the converter and the temperature of the ammonia-containing product withdrawn from the converter.

8. The process of claim 1, further comprising, when a drop or surge of the flow rate of makeup gas transferred from the front end to the synthesis loop is detected, increasing the amount of feed gas bypassing the converter in the event of a drop of flow or decreasing said amount in the event of a surge of flow.

9. The process of claim 1, wherein said condition of partial load includes loads until the make-up gas transferred from the frontend to the synthesis loop is 15% of the nominal flow rate.

10. The process of claim 1, wherein the production of makeup gas in the front end includes the production of hydrogen from a renewable energy source.

\*  \*  \*  \*  \*